United States Patent [19]

Hardage, Jr. et al.

[11] Patent Number: 5,822,764
[45] Date of Patent: Oct. 13, 1998

[54] METHOD AND CIRCUIT FOR EFFICIENTLY REPLACING INVALID LOCKED PORTIONS OF A CACHE WITH VALID DATA

[75] Inventors: James N. Hardage, Jr., Kyle; Glen A. Harris, Austin, both of Tex.

[73] Assignee: Motorola, Inc., Schaumburg, Ill.

[21] Appl. No.: 610,013

[22] Filed: Mar. 4, 1996

[51] Int. Cl.[6] .................................................. G06F 12/14
[52] U.S. Cl. ........................... 711/145; 711/144; 711/163
[58] Field of Search ..................................... 711/125, 145, 711/163, 164; 395/472, 460, 182.19

[56] References Cited

U.S. PATENT DOCUMENTS

| | | | |
|---|---|---|---|
| 4,513,367 | 4/1985 | Chan et al. | 711/145 |
| 4,729,093 | 3/1988 | Mothersole et al. | |
| 4,742,454 | 5/1988 | Robinson et al. | |
| 4,763,253 | 8/1988 | Bluhm et al. | |
| 5,060,144 | 10/1991 | Sipple et al. | 395/726 |
| 5,113,522 | 5/1992 | Dinwiddie, Jr. et al. | |
| 5,226,143 | 7/1993 | Baird et al. | 711/145 |
| 5,301,290 | 4/1994 | Tetzlaff et al. | 711/142 |
| 5,487,162 | 1/1996 | Tanaka et al. | 711/145 |
| 5,544,342 | 8/1996 | Dean | |
| 5,546,579 | 8/1996 | Josten et al. | 707/8 |
| 5,555,393 | 9/1996 | Tanaka et al. | 711/133 |
| 5,574,922 | 11/1996 | James | 395/561 |
| 5,586,293 | 12/1996 | Baron et al. | 711/118 |
| 5,586,295 | 12/1996 | Tran | |
| 5,737,536 | 4/1998 | Herrmann et al. | 395/200.59 |

OTHER PUBLICATIONS

Motorola MC68030 User's Manual, "MC68030 Enhanced 32–Bit Microprocessor User's Manual", published 1987, pp. 6–4 –6–5.

Motorola MC68030 User's Manual, "MC68030 Ennchanced 32–Bit Microprocessor User's Manual", published 1987, pp. 6–15 –6–16.

Motorola M68060 User's Manual, 5.2 Cache Control Register, published 1994, pp. 5–5 –5–10.

Motorola MC88110 Second Generation RISC Microprocessor User's Manual, published 1991, Section 6, pp. 6–1– 6–45.

*Primary Examiner*—Tod R. Swann
*Assistant Examiner*—J. Peikari

[57] ABSTRACT

A cache locking mechanism is implemented so that portions of the cache may be locked to protect critical instructions or data residing within the cache. Such a cache may be associated with a processor chip, coupled to a data processing system. The cache locking mechanism forces de-allocation of cache entries to the unlocked section of the cache. However, allocation of cache entries is performed regardless of whether or not an entry resides within the locked portion, provided that there exists invalid entries within the locked portion.

21 Claims, 5 Drawing Sheets

FIG. 4 -PRIOR ART-

METHOD AND CIRCUIT FOR EFFICIENTLY REPLACING INVALID LOCKED PORTIONS OF A CACHE WITH VALID DATA

FIELD OF THE INVENTION

The present invention relates in general to data processing systems, and in particular to circuitry for controlling a cache within a processor.

BACKGROUND OF THE INVENTION

Within a computer system, microprocessors (hereinafter also referred to as "processors" or "CPUs") often make use of one or more caches, which are special memory subsystems in which frequently used information (e.g., data values and/or instructions) are held for quick access by the processor. When the processor references an address in memory, the cache checks to see whether it holds the data or instructions corresponding to that address. If it does hold the data or instructions corresponding to the address, the data or instructions is returned to the processor; otherwise, a regular memory access occurs. An access to cache memory is faster than an access to main memory (eg., RAM (random access memory) or system storage).

As the performance of microprocessors increases, the need to maximize the utilization of the cache memory system becomes increasingly important. For example, caches often employ a "freeze" or "lock" feature to ensure that time critical instructions or data are in the cache and cannot be de-allocated (or removed) from the cache.

Microprocessors typically lock a portion of the cache by asserting a bit which prevents any allocation of entries in the locked section (i.e., read or write hits can occur in the locked section, however no filling cache data due to an allocation resulting from a read or write miss can be placed in the locked section).

This method has two pitfalls. First, the instructions or data have to be in the cache before the cache is locked. Secondly, any invalid entries within the locked section after the lock bit is asserted are unusable. This may be readily seen by referring to FIG. 2, which shows a block diagram of typical array utilization during cache lock operation, wherein LEVELS 0 and 1 of the cache are locked. Several entries in this locked section include valid entries, while one or more entries in this locked section include invalid entries, which are unusable as a result of being included in a locked section. LEVELS 2 and 3 of the cache are unlocked and therefore include usable cache entries.

The problem with the foregoing typical cache lock is that a locked section may include invalid entries, rendered unusable, which otherwise could be used to cache data or instructions. Thus, the efficiency of use of the cache is reduced (by nature of excluding these invalid entries from the group of entries which are allocatable).

As a result, there is a need in the art for systems and methods for providing a cache locking mechanism that allows the continued allocation of invalid entries within the locked portion of the cache.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENT

Figure 1:
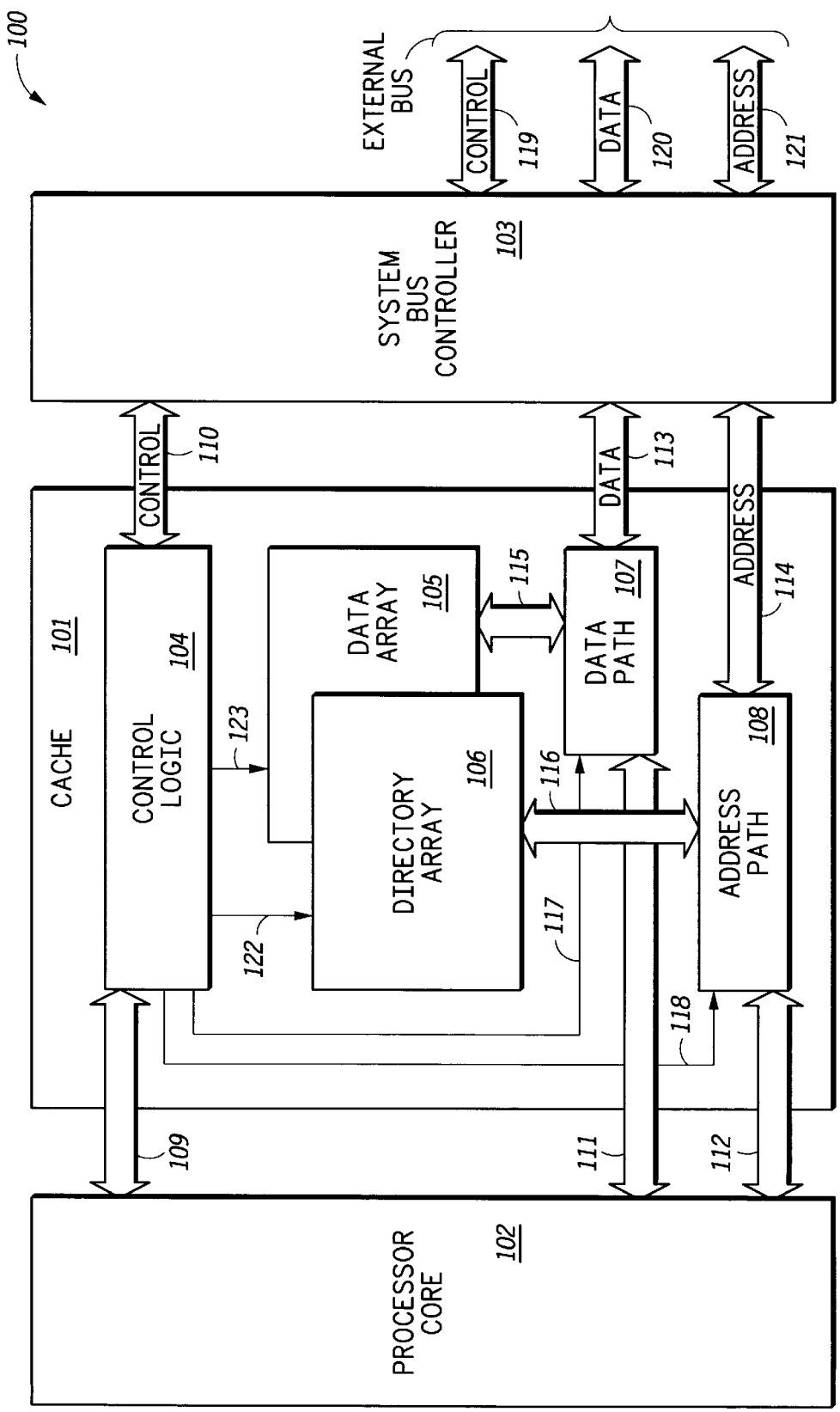
FIG. 1 illustrates in block diagram form a processor configured in accordance with the present invention.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

In the following description, a cache array may be implemented with the following structure:

|         | level 0 | level 1     | level N-1 | level N |
|---------|---------|-------------|-----------|---------|
| row 0   |         |             |           |         |
| row 1   |         |             |           |         |
| row 2   |         | // entry x //|          |         |
| .       |         |             |           |         |
| .       |         |             |           |         |
| .       |         |             |           |         |
| row M-1 |         |             |           |         |
| row M   |         |             |           |         |

Additionally, the following are definitions of terms used in this description:

row—The quantity specified by an index (via address bits) into a cache array (i.e., the horizontal divisions above).

level—The quantity specified by the rules of set associativity. An N-way set-associative cache contains N levels (i.e., the vertical divisions above).

entry—A single identifiable entity within a cache specified by the intersection of a row and level (i.e., "entry x" below is identified as the intersection of row 2 and level 1).

allocate—A new entry is written in the cache.

de-allocate—An entry is removed from the cache.

replace—A new entry is written over a valid entry resident in the cache.

tag bits—The portion of an address retained in the cache to identify a cache entry.

dirty bits—Indicate that a specific valid cache entry has been modified locally (within the cache) but not in main memory.

valid bits—Indicate that a specific cache location has been allocated (an entry has been written to this location) and that entry has not been de-allocated (removed from the cache).

replacement level—The level generated by a replacement algorithm (any one of a number of typical processes for allocating and de-allocating entries in a cache).

Used to specify the entry allocated and de-allocated during replacement.

invalid level—A level that contains an invalid entry.

Used to specify the entry allocated where the allocation does not involve replacement.

hit level—A level specified by a match of the address presented to the cache and a valid entry resident in the cache.

Used to specify the valid and resident entry to manipulate (read or write).

Refer now to the drawings wherein depicted elements are not necessarily shown to scale and wherein like or similar elements are designated by the same reference numeral through the several views.

Referring to FIG. 1, there is illustrated processor 100, which may be implemented within a single integrated circuit ("chip"), including processor core 102 coupled to cache 101, which is coupled to system bus controller 103. System bus controller 103 is coupled to an external (system) bus, such as bus 612 illustrated in FIG. 6, further discussed below. The external bus may be partitioned into a control section 119, a data section 120, and an address section 121. Cache 101 includes cache control logic 104, data array 105, directory array 106, data path 107, and address path 108. Cache control logic 104 operates to control data array 105 by connection 123. Control logic 104 controls the operation of directory array 106 by connection 122. Likewise, data path 107 and address path 108 are controlled by control logic 104 by connections 117 and 118, respectively.

Cache 101 may be a data cache or an instruction cache or unified cache (both data and instruction in combination).

Control logic 104 passes control data to and from processor core 102 by bus 109. Likewise, control information is passed between control logic 104 and system bus controller 103 by bus 110.

Data array 105 operates to store cached data or instructions. Directory array 106 operates in conjunction with data array 105 to store address and control information pertaining to each of the data entries in data array 105. Such address and control information stored in directory array 106 might include such typical information as tag bits, dirty bits, and valid bits.

Data path 107 operates to control the flow of data or instructions to and from system bus controller 103 by bus 113, to and from processor core 102 by bus 111, and to and from data array 105 by bus 115. Address path 108 operates to control the flow of address information to and from system bus controller 103 by bus 114, to and from processor core 102 by bus 112, and to and from directory array 106 by bus 116.

Figure 2:
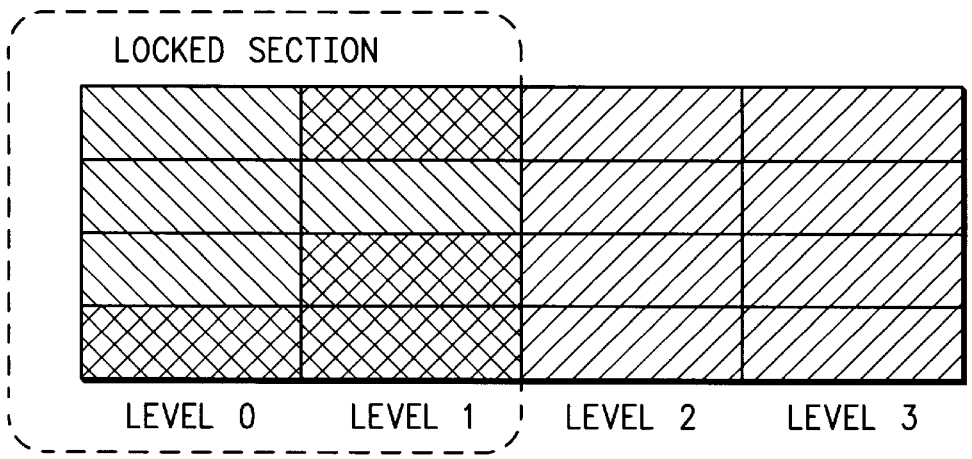
FIG. 2 illustrates array utilization with a prior art technique for locking a portion of a cache.

The typical approach for cache locking, as briefly described above with respect to FIG. 2, uses a lock bit to prevent any allocation in the locked section. Portions of data array 105 may be locked by asserting a lock bit in a control register within control logic 104.

Figure 4:
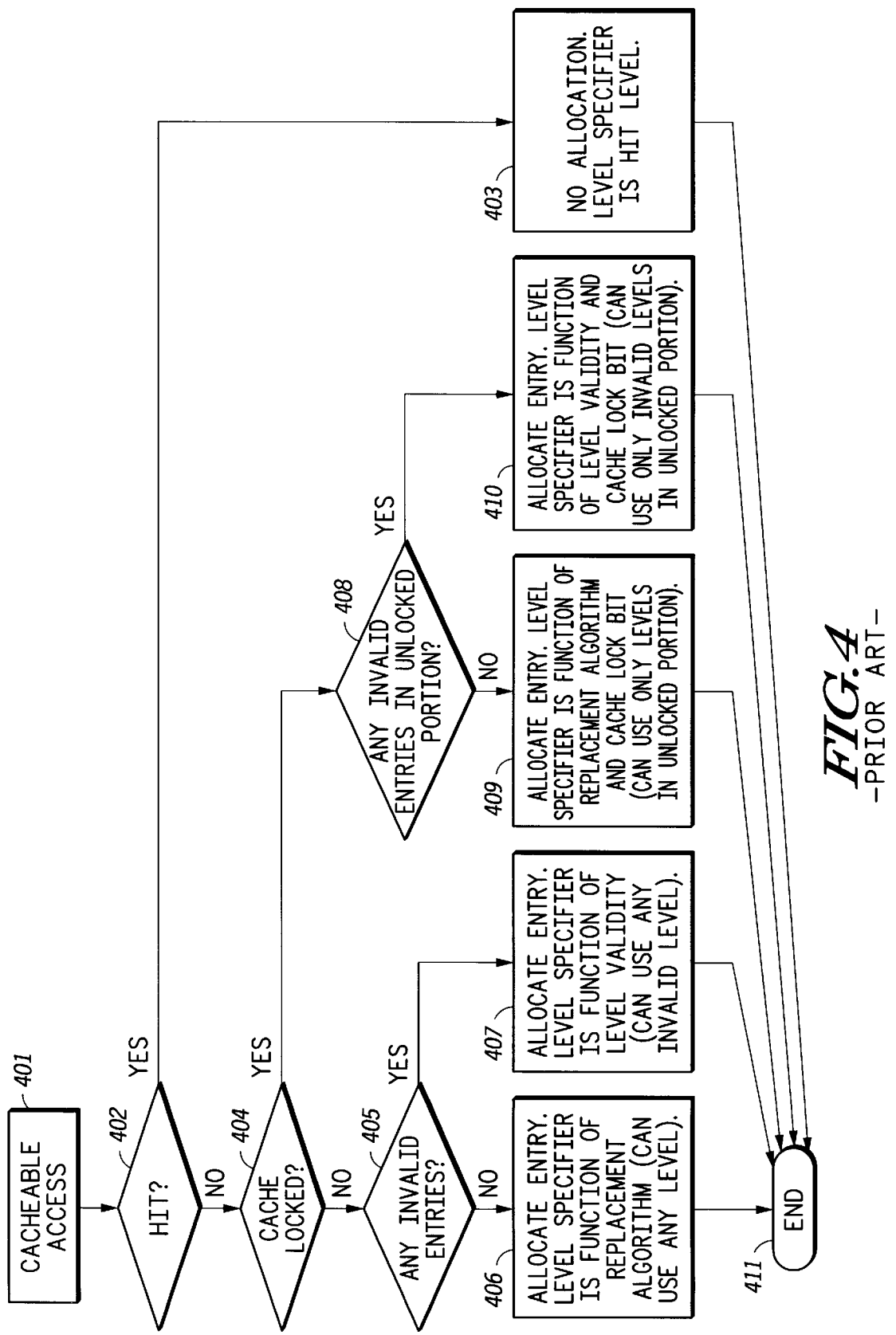
FIG. 4 illustrates a flow diagram for allocating entries within a cache implementing a prior art cache locking mechanism.

The flow diagram in FIG. 4 further illustrates this typical approach. In step 401, a cacheable access is received from processor core 102. Essentially, processor core 102 is accessing an instruction or data. In accordance with the typical operation of a cache, cache 101 first determines in step 402 whether or not the instruction or data currently resides in valid form in data array 105. If so, the process moves to step 403 where no allocation is necessary and the hit level specifies the level accessed. The process then ends in step 411.

If, however, in step 402 there is a miss on the accessed instruction or data, the process then moves to step 404 to determine whether or not any portions of array 105 are locked. If so, the process moves to step 408 to determine whether or not there are any invalid entries in the unlocked region of the row indexed by the applied address. If there are not, the process proceeds to step 409 to allocate an entry in a level specified by some function of the replacement algorithm and cache lock bit implemented within cache 101. Since the cache lock mechanism has been activated, the replacement algorithm is forced to point to an unlocked portion of array 105. An entry in the unlocked portion will then be allocated and directory array 106 updated appropriately.

If, however, in step 408, there does exist an invalid entry in the unlocked region of the row indexed by the applied address, the process proceeds to step 410 to allocate an invalid entry in the unlocked region. Because there is a cache lock enforced, an invalid entry residing in the unlocked region of array 105 is allocated.

If in step 404, a cache lock has not been activated, the process will proceed to step 405 to determine whether there are any invalid entries in the row indexed by the applied address. If yes, the process proceeds to step 407 to allocate one of these invalid entries, and updates directory array 106 appropriately. If in step 405 there are no invalid entries, then the process will proceed to step 406 to allocate an entry in a level specified by some function of the replacement algorithm. Thus, any level may be used for this allocation.

As can be seen by the process illustrated with respect to FIG. 4, allocation of entries in a locked portion of cache 101 is not possible.

Figure 3:
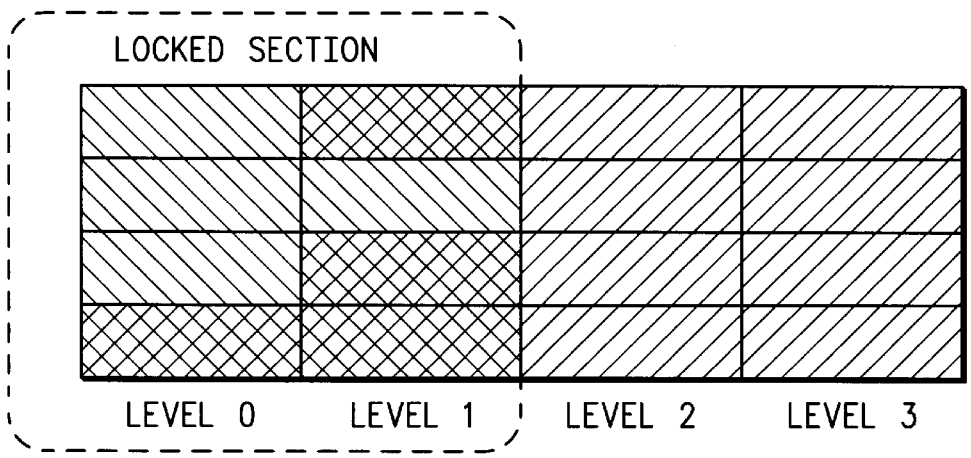
FIG. 3 illustrates array utilization with a cache locking mechanism in accordance with the present invention.

Referring next to FIG. 3, there is a depiction of an implementation of one embodiment of the present invention with respect to a cache locking mechanism. With such an approach, the lock bit mentioned above is used to force any de-allocation (i.e., any replacement) of a cache entry to the unlocked portion of cache 101. Further, the present invention permits allocation of cache entries in a locked region provided that there are any invalid entries existing within this locked region. Since de-allocation can only occur in the unlocked region, locked entries are preserved.

Figure 5:
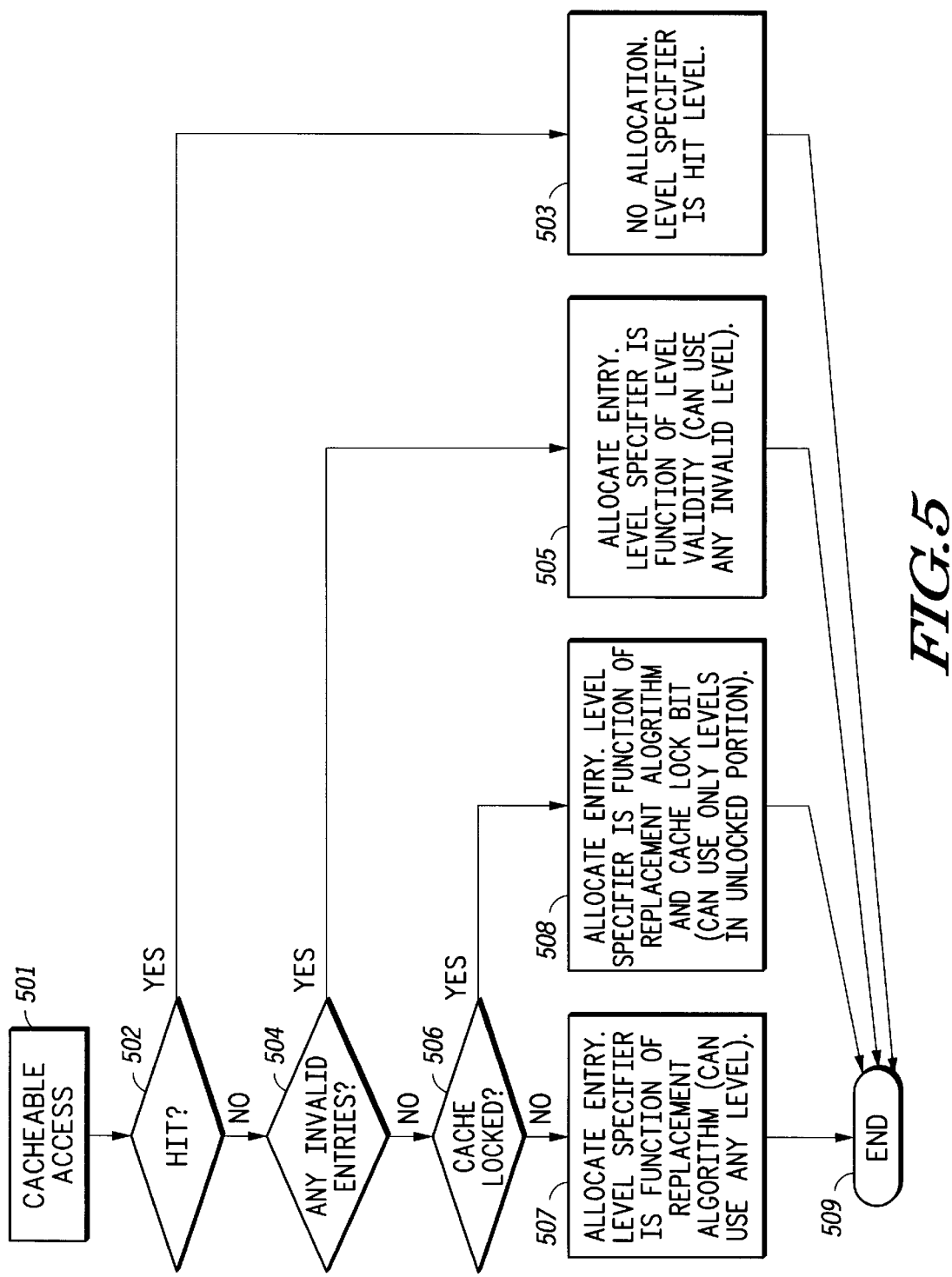
FIG. 5 illustrates a flow diagram of an allocation of cache entries in a cache implemented in accordance with the present invention.

Referring next to FIG. 5, there is a flow diagram of the process of the present invention, which may be implemented as logic circuitry within control logic 104. First, in step 501, a cacheable access is received from processor core 102. If there is a determination in step 502 that there is a hit in cache 101, the process proceeds to step 503 where no allocation is necessary and the hit level specifies the level accessed.

If, however, in step 502 there is a miss in cache 101 with respect to the accessed instruction or data, the process proceeds to step 504 to determine whether or not there are any invalid entries in the row indexed by the applied address. If there are, the process proceeds to step 505 to allocate one of these invalid entries. A cache level specified is a function of level validity, i.e., an allocation can use any invalid level. Also, appropriate information in directory array 106 is modified.

As can be seen, allocation of entries in data array 105 is performed regardless of whether or not the entry resides within a locked portion. The process of the present invention is concerned only with whether or not there are any invalid entries for an allocation.

If in step 504 there are no invalid entries designated, then the process proceeds to step 506 to determine whether or not the cache is locked. If the cache is locked, the process proceeds to step 508 to allocate an entry specified by a replacement algorithm. The cache lock forces the replacement algorithm to point to an entry in the unlocked portion of data array 105. Consequently, this allocation uses the unlocked level pointed to by the replacement algorithm, and appropriate information in directory array 106 is modified. This process is referred to as a replacement because a new entry is being allocated over a valid entry.

If in step 506 the cache is not locked, then the process proceeds to step 507 whereby the replacement algorithm specifies any level for allocation. The process ends at step 509.

Advantages of the present invention are that allocation of entries in a locked portion of cache 101 is possible and the cache lock mechanism can be activated before, during, or after the entries intended to be locked are allocated.

Figure 6:
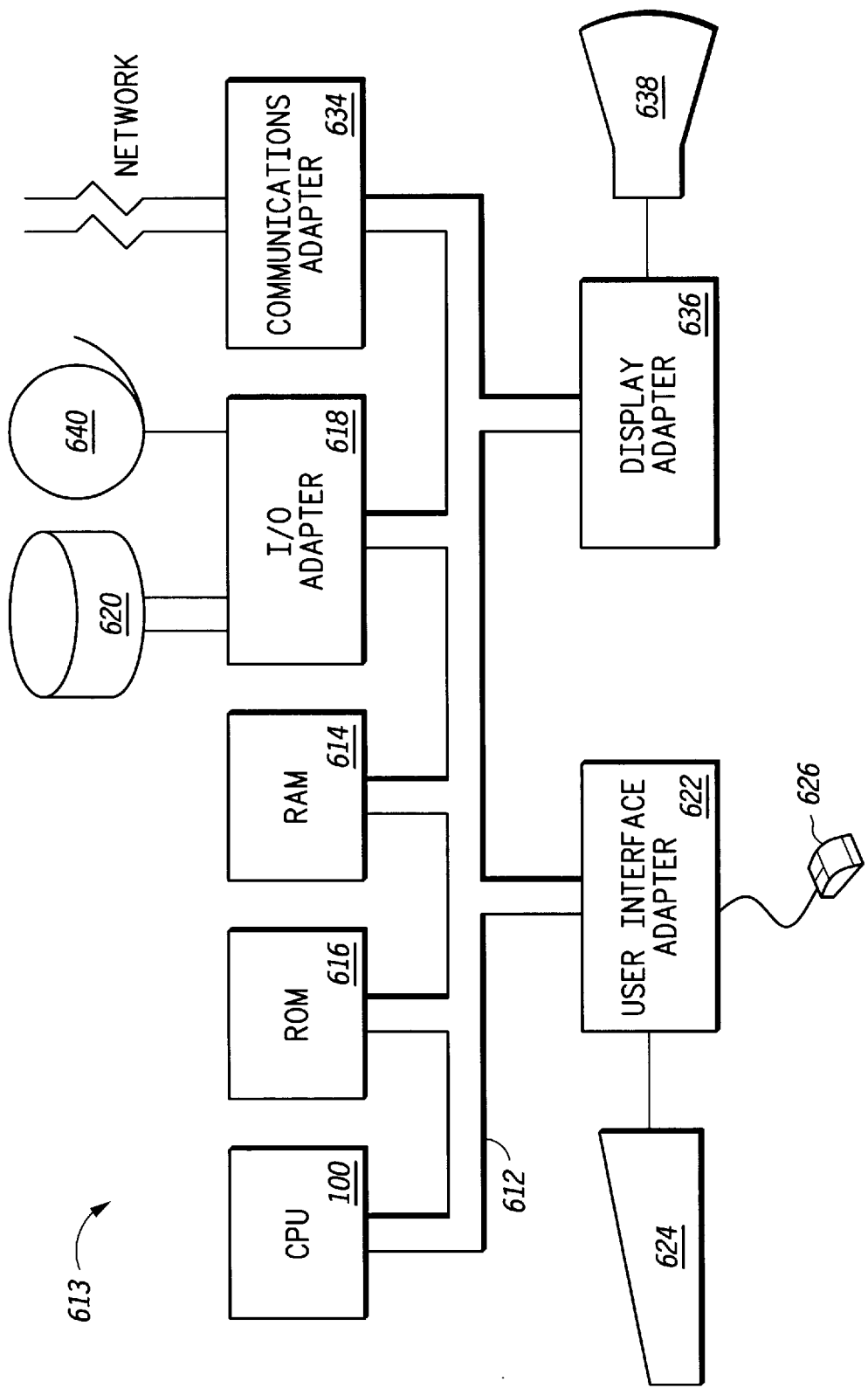
FIG. 6 illustrates a data processing system configured in accordance with the present invention.

A representative hardware environment for practicing the present invention is depicted in FIG. 6, which illustrates a typical hardware configuration of workstation 613 in accordance with the subject invention having central processing unit (CPU) 100 (see FIG. 1), and a number of other units interconnected via system bus 612. Workstation 613 shown in FIG. 6 includes random access memory (RAM) 614, read only memory (ROM) 616, and input/output (I/O) adapter 618 for connecting peripheral devices such as disk units 620 and tape drives 640 to bus 612, user interface adapter 622 for connecting keyboard 624, mouse 626, and/or other user interface devices such as a touch screen device (not shown) to bus 612, communications adapter 634 for connecting workstation 613 to a data processing network, and display adapter 636 for connecting bus 612 to display device 638. CPU 100 may include other circuitry not shown herein, which will include circuitry commonly found within a microprocessor, e.g., execution unit, bus interface unit, arithmetic logic unit, etc. CPU 100 may also reside on a single integrated circuit.

CPU 100 may retrieve requested instruction or data information from various portions of system 613, such as ROM 616, RAM 614, storage devices 620 and 640, etc.

Although the present invention and its advantages have been described in detail, it should be understood that various changes, substitutions and alterations can be made herein without departing from the spirit and scope of the invention as defined by the appended claims.

We claim:

1. A processor comprising:
   a processor core; and
   a cache coupled to said processor core, wherein said cache comprises:
     memory circuitry operable for storing information;
     control circuitry operable for locking a portion of said memory circuitry so that information stored in said portion cannot be de-allocated unless said information is marked invalid either before or after said portion of said memory circuit is locked; and
     control circuitry operable for permitting allocation of information into said portion.

2. The processor as recited in claim 1, wherein said allocation of information into said portion is permitted when invalid entries are created in said portion after said portion is placed into a locked state whereby the invalid entries are marked as invalid by one or more invalid bits associated with one or more portions of the memory circuitry.

3. The processor as recited in claim 1, wherein said cache is an instruction cache.

4. The processor as recited in claim 1, wherein said allocation of information into said portion is performed in response to an access to said cache from said processor core, wherein said access results in a miss in said cache.

5. The processor as recited in claim 4, wherein said processor comprises a bus interface unit coupled to said cache, wherein said processor is coupled to a system memory coupled to said bus interface unit via a system bus, and wherein said miss in said cache results in a retrieval of information corresponding to said access from said system memory to said processor core and to said cache, and wherein said information corresponding to said access is written to said portion.

6. The processor as recited in claim 1, wherein said cache further comprises control circuitry for forcing replacement of entries in said cache to an unlocked portion of said cache.

7. A method for controlling allocation of entries in a cache, said method comprising the steps of:
   receiving an access to said cache; and
   if said access results in a miss in said cache, allocating a locked entry in said cache for a subsequent write to said cache resulting from said miss regardless of whether or not said entry was previously marked valid while locked.

8. The method as recited in claim 7, wherein said access is received from a processor coupled to said cache.

9. The method as recited in claim 7, wherein entries in said locked portion of said cache cannot be de-allocated by a normal replacement algorithm of the cache unless said portion is marked as invalid.

10. The method as recited in claim 9, wherein said entry is marked by a tag bit to be an invalid entry.

11. The method as recited in claim 10, wherein said entry allocated is in said locked portion of said cache and was marked invalid after said locked portion was placed into a locked state.

12. The method as recited in claim 10, further comprising the step of:
   if there are no invalid entries to allocate in said cache, allocating an entry in said cache for said subsequent write in an unlocked portion of said cache when said locked portion of said cache is enabled.

13. The method as recited in claim 10, further comprising the step of:
   if there are no invalid entries to allocate in said cache, allocating an entry in said cache for said subsequent write in any portion of said cache when said locked portion of said cache is not enabled.

14. The method as recited in claim 8, wherein said access corresponds to a request for information by said processor, and wherein said receiving and allocating steps further comprise the steps of:
   determining if there is a hit or said miss on said cache in response to said access from said processor;
   if there is said miss on said cache in response to said access from said processor, determining if there are any invalid entries designated in said cache;
   if there are one or more of said invalid entries designated in said cache, allocating one of said one or more invalid entries to be written with said requested information;
   if there are no invalid entries designated in said cache, determining if any portion of said cache is locked, wherein entries in said locked portion of said cache cannot be de-allocated;
   if there is not a locked portion of said cache, allocating any entry in said cache to be written with said requested information; and
   if there is said locked portion of said cache, allocating an entry in an unlocked portion of said cache to be written with said requested information.

15. Cache control circuitry, comprising:

circuitry operable for receiving an access from a processor to a cache coupled to said cache control circuitry and to said processor;

circuitry operable for determining if there is a hit or a miss on said cache in response to said access from said processor;

circuitry operable for determining if there are any invalid entries designated in said cache if there is said miss on said cache in response to said access from said processor;

circuitry operable for allocating one of said one or more invalid entries to be written with requested information if there are one or more of said invalid entries designated in said cache, said invalid entries being selected independent of whether the invalid entries are locked or unlocked;

circuitry operable for determining if any portion of said cache is locked, wherein entries in said locked portion of said cache cannot be de-allocated if there are no invalid entries designated in said cache;

circuitry operable for allocating any entry in said cache to be written with said requested information if there is not a locked portion of said cache; and circuitry operable for allocating an entry in an unlocked portion of said cache to be written with said requested information if there is said locked portion of said cache.

16. The cache control circuitry as recited in claim 15, wherein said cache is an instruction cache.

17. The cache control circuitry as recited in claim 15, wherein said cache is a data cache.

18. The cache control circuitry as recited in claim 15, wherein said cache is a unified cache containing both instructions and data.

19. A method for operating a cache in a data processing system, the method comprising the steps of:

creating a locked portion of the cache and an unlocked portion of the cache;

invalidating an entry in the locked portion of the cache;

initiating a read of a value from memory wherein the value is not found in the cache;

accessing the value from external memory; and replacing the entry in the locked portion of the cache with the value from external memory.

20. The method of claim 19 wherein the step of replacing occurs even if an invalid unlocked location exists in the cache.

21. A method for operating a cache in a data processing system, the method comprising the steps of:

creating a locked portion of the cache in a locked state and an unlocked portion of the cache which is not in the locked state;

validating and invalidating entries within the locked portion of the cache as software is executed using the data processing system;

initiating a read of a value from external memory wherein the value is not found in the cache;

reading the value from external memory in response to the value not being found in the cache;

determining if there are any appropriate invalid entries in the cache independent of the locked state of the portions of the cache;

writing the value into the appropriate invalid entry of the cache if an appropriate invalid entry is found independent of the locked state of the portions of the cache; and using a cache replacement algorithm to replace a non-locked entry of the cache with the value if no appropriate invalid entries are found in the cache.

* * * * *